(12) United States Patent
Yeoman et al.

(10) Patent No.: US 11,186,980 B2
(45) Date of Patent: Nov. 30, 2021

(54) STORM WATER DRAIN SYSTEM AND COMPONENTS THEREOF AND METHODS OF USE

(71) Applicant: Stormwater360 Group Limited, Rosedale Auckland (NZ)

(72) Inventors: Gregory Paul Yeoman, Oneroa Waiheke Island (NZ); Michael Morton Hannah, Herne Bay Auckland (NZ)

(73) Assignee: Stormwater360 Group Limited, Rosedale Auckland (NZ)

( * ) Notice: Subject to any disclaimer, the term of this patent is extended or adjusted under 35 U.S.C. 154(b) by 0 days.

(21) Appl. No.: 16/767,462

(22) PCT Filed: Nov. 23, 2018

(86) PCT No.: PCT/NZ2018/050167
§ 371 (c)(1),
(2) Date: May 27, 2020

(87) PCT Pub. No.: WO2019/103627
PCT Pub. Date: May 31, 2019

(65) Prior Publication Data
US 2020/0370290 A1    Nov. 26, 2020

(30) Foreign Application Priority Data

Nov. 27, 2017 (NZ) .................................. 737777

(51) Int. Cl.
*E03F 5/04* (2006.01)
*E03F 5/14* (2006.01)
(Continued)

(52) U.S. Cl.
CPC ........ *E03F 5/0404* (2013.01); *B01D 21/0039* (2013.01); *E03F 5/0403* (2013.01); *E03F 5/14* (2013.01); *E03F 5/10* (2013.01)

(58) Field of Classification Search
CPC ......... E03F 5/0403; E03F 5/0404; E03F 5/10; E03F 5/14; E03F 5/16; B01D 21/0039;
(Continued)

(56) References Cited

U.S. PATENT DOCUMENTS 2,624,463 A * 1/1953 Freese ................ B01D 17/0208
                                                      210/519
3,391,791 A * 7/1968 Seney ....................... E03F 5/14
                                                      210/232
(Continued)

FOREIGN PATENT DOCUMENTS

| DE | 29915075 | * | 3/2000 |
| WO | 2012036569 A1 | | 3/2012 |
| WO | 2017196189 A1 | | 11/2017 |

OTHER PUBLICATIONS

Machine translation of DE 299 15 075, Mar. 2000 (Year: 2000).*
(Continued)

*Primary Examiner* — Christopher Upton
(74) *Attorney, Agent, or Firm* — Merchant & Gould P.C.

(57) ABSTRACT

A method of removing sediment from fluid flow within a storm water drain pit by deflecting flow entering the pit towards the side walls of the pit by one or more deflectors. This reduces the energy of the fluid flow and promotes settling of sediment within the catch pit. Each deflector is preferably of a concave form and may be located in a storm water drain pit bag or suspended. A removable catch basin receptacle for a storm water drain pit includes a container has a low flow outlet defining a fluid path for fluid at a first level within the container to a second level, higher than the first level, outside the container. An overflow path provides a fluid flow path out of the container at a level higher than the first or second level.

15 Claims, 5 Drawing Sheets

(51) Int. Cl.
   *B01D 21/00*   (2006.01)
   *E03F 5/10*   (2006.01)

(58) Field of Classification Search
   CPC ............ B01D 21/0042; B01D 21/0087; B01D 21/2405
   USPC ..... 210/163, 164, 170.03, 519, 747.2, 747.3
   See application file for complete search history.

(56) References Cited

U.S. PATENT DOCUMENTS

| | | | | |
|---|---|---|---|---|
| 5,004,534 | A * | 4/1991 | Buzzelli | E03F 5/14 210/164 |
| 5,284,580 | A * | 2/1994 | Shyh | E03F 5/0403 210/163 |
| 5,378,378 | A | 1/1995 | Meurer | |
| 5,505,860 | A * | 4/1996 | Sager | B01D 21/0042 210/519 |
| 5,746,911 | A * | 5/1998 | Pank | E03F 5/16 210/170.03 |
| 5,753,115 | A * | 5/1998 | Monteith | E03F 5/16 210/170.03 |
| 6,086,758 | A * | 7/2000 | Schilling | E03F 5/0404 210/164 |
| 6,200,484 | B1 * | 3/2001 | McInnis | E03F 5/0404 210/164 |
| 8,142,666 | B1 | 3/2012 | Happel | |
| 2002/0057944 | A1 * | 5/2002 | Adams | E03F 5/0404 405/39 |
| 2002/0139736 | A1 | 10/2002 | Stever et al. | |
| 2007/0199869 | A1 * | 8/2007 | Al-Assfour | E03F 5/0404 210/164 |
| 2012/0195686 | A1 * | 8/2012 | Hardgrave | E03F 5/0404 405/52 |

OTHER PUBLICATIONS

International Written Opinion for International Application No. PCT/NZ2018/050167 dated Mar. 25, 2019 (7 pages).
International Written Opinion for International Application No. PCT/NZ2018/050167 dated Mar. 25, 2019 (10 pages).
International Preliminary Report on Patentability for International Application No. PCT/NZ2018/050167 dated Jun. 2, 2020 (8 pages).

* cited by examiner

STORM WATER DRAIN SYSTEM AND COMPONENTS THEREOF AND METHODS OF USE

This application is a National Stage Application of PCT/NZ2018/050167, filed 23 Nov. 2018, which claims benefit of Serial No. 737777, filed 27 Nov. 2017 in New Zealand and which applications are incorporated herein by reference. To the extent appropriate, a claim of priority is made to each of the above disclosed applications.

FIELD OF THE INVENTION

This invention relates to a filtration apparatus for removing and recovering particulates and contaminants from storm water run-off. It also relates to methods of operating storm water drain filters.

BACKGROUND OF THE INVENTION

Storm water (also known as stormwater) and contaminants (i.e. gross particulate matter, sediment, oil, grease, hydrocarbons, heavy metals etc,) enters storm water drains via 'pits' also known as catchpits, gully traps, catch basins and stormwater inlets. In many situations it is desirable to retain contaminants at the point of entry to the stormwater system and to periodically remove them to avoid blockage and contamination of the stormwater drainage system. A wide variety of storm water drain systems and components have been developed for this purpose including those described in the applicant's prior applications PCT/NZ2011/000193 and PCT/NZ2017/050057, the disclosure of which is hereby incorporated by reference.

Desirable features of a stormwater drain system are:
to retain a large volume of contaminants, compared to the size and dimensions of a specific catchpit—high volume efficiency;
to maintain performance and throughput of the catchpit during periods of high flow;
To remove and retain gross particulate matter within the catchpit;
To remove and retain sediment suspended in the incoming flow within the catchpit;
To prevent mosquitos breeding within the sump in mosquito prone areas; and
to allow easy maintenance by hand, without the requirement for mechanical lifting or induction by vacuum truck.

It can be difficult to improve the performance of existing pits without expensive modification and providing enhanced features within the catchpit itself may also be expensive.

It is an object of the invention to provide an improved storm water drain system and components and methods of operation or to at least provide the public with a useful choice.

Reference to any prior art in this specification does not constitute an admission that such prior art forms part of the common general knowledge.

SUMMARY OF THE INVENTION

According to one exemplary embodiment there is provided a method of removing sediment from fluid flow within a storm water drain pit comprising deflecting flow entering the pit towards the side walls of the pit by one or more deflectors so as to reduce the energy of the fluid flow and promote settling of sediment within the catch pit.

According to another exemplary embodiment there is provided a removable catch basin receptacle for a storm water drain pit comprising a container having:
a. a base and side walls defining an opening at the top of the container;
b. a low flow outlet defining a fluid path for fluid at a first level within the container to a second level, higher than the first level, outside the container; and
c. an overflow path providing a fluid flow path out of the container at a level higher than the first or second level.

According to a further exemplary embodiment there is provided a storm water drain system including a catchpit having one or more deflector within the catchpit configured to redirect fluid flow entering the catchpit outwardly and upwardly towards the side walls of the catchpit.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
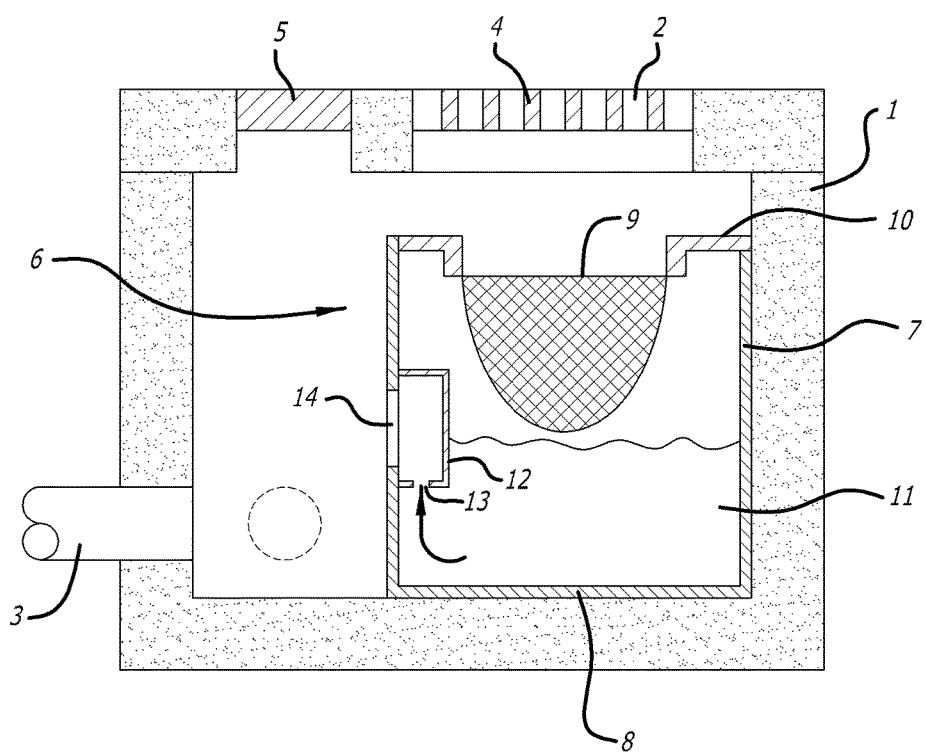
FIG. 1 shows a cross-sectional side view of a storm water drain system including a removable catch basin receptacle with a gross pollutant basket.

Referring to FIG. 1 there is shown a storm water drain system in which a removable catch basin receptacle 6 is provided within a conventional catchpit 1. The catchpit 1 has an inlet 2, outlet 3, entry grate 4 and inspection port 5. Such a conventional catchpit has an outlet located near the base and so does not retain a standing sump of water.

It has been found that providing a standing sump of water and dissipating the energy of fluid flow into a catchpit can greatly enhance the settling and retention of sediment within the catchpit. Whilst either technique alone is beneficial the combination of both techniques may be particularly beneficial.

FIG. 1 shows a removable catch basin receptacle 6 for a storm water drain pit including a single container having side walls 7 and a base 8. The receptacle is removable and may be retrofitted to existing catchpits or installed in new catchpits. A mesh basket 9 may be provided over the opening to the receptacle to collect gross pollutants, with the size of mesh determining the size of gross pollutants removed. These gross pollutants may be removed by periodically emptying basket 9. A gasket 10 provides a seal between to opening of the receptacle and basket 9 to ensure that flow goes through the receptacle during normal operation.

During normal operation a sump of standing water 11 remains in the receptacle 6. The level of this sump water is controlled by a low flow outlet. In this case the low flow outlet is in the form of a conduit formed by a division 12 running between opposite side walls 7 of the container which defines a fluid path from a first level at inlet 13 to a second level at outlet 14. This ensures that floatable materials and oils etc. are retained within the receptacle and prevents the entry of mosquitos etc. The size on the inlet orifice 13 may be dimensioned to provide desired flow characteristics for a specific application.

Basket 9 will act to dissipate energy of the incoming flow and standing sump water 11 will further remove energy from the flow. This and the outlet flow path assist in removing suspended sediment from the incoming flow. Sediment collected within the receptacle may be periodically removed. The basket 9 keeps large particulate material above the sump water level to keep it dry between inflows.

During high flow conditions the receptacle may fill at a rate faster than the outlet can remove it and under these conditions the top edge of the receptacle defines a bypass flow path with the excess flow simply flowing over the edge of the receptacle.

Figure 2:
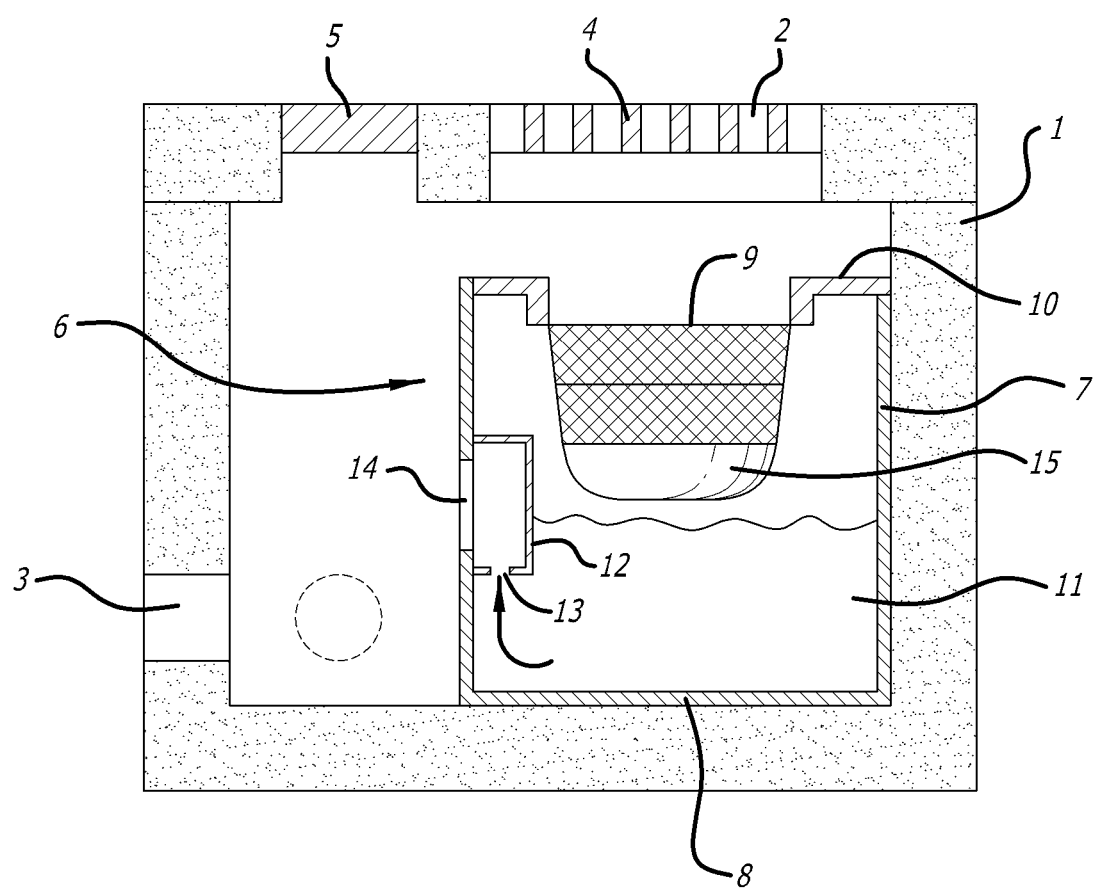
FIG. 2 shows a cross-sectional side view of a storm water drain system including a removable catch basin receptacle with a gross pollutant basket and a deflector.

FIG. 2 shows the storm water drain system shown in FIG. 1 with a deflector 15 provided in the base of basket 9. In this case the deflector 15 is in the form of a concave parabolic dish. The deflector 15 serves to redirect the majority of incident flow from the inlet 2 upwardly and outwardly, removing much of the energy from the flow. The fluid then flowing down the side walls is retarded due to cohesion with the side walls. Baffles may be added to the side walls to further remove energy from the flow. When the retarded flow reaches the sump water 11 much of its energy has been removed and it further settles to release sediment into the base of the container.

Figure 3:
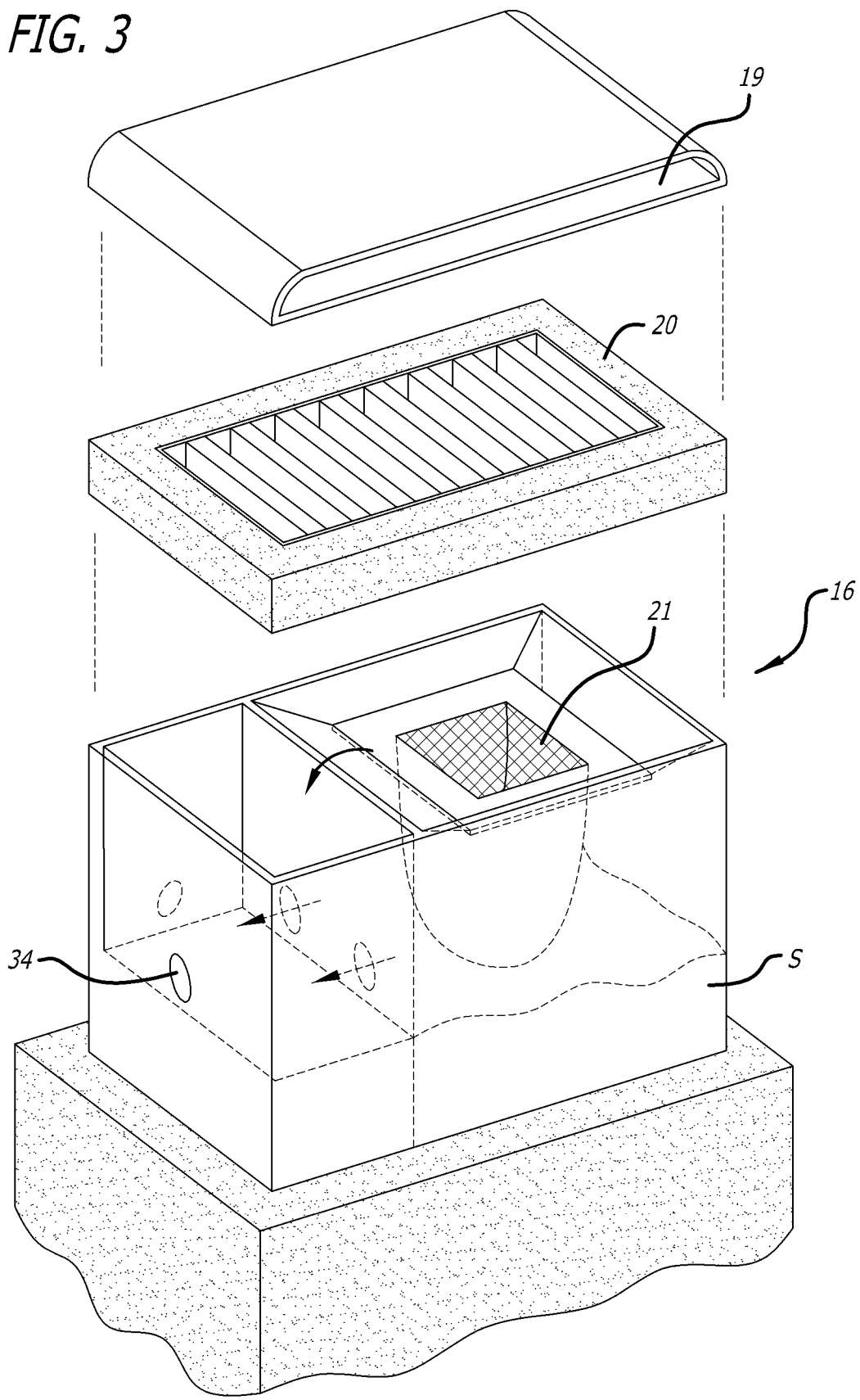
FIG. 3 shows a perspective view of a storm water drain system including a removable catch basin receptacle with an outlet bay, a gross pollutant basket and a deflector.
Figure 4:
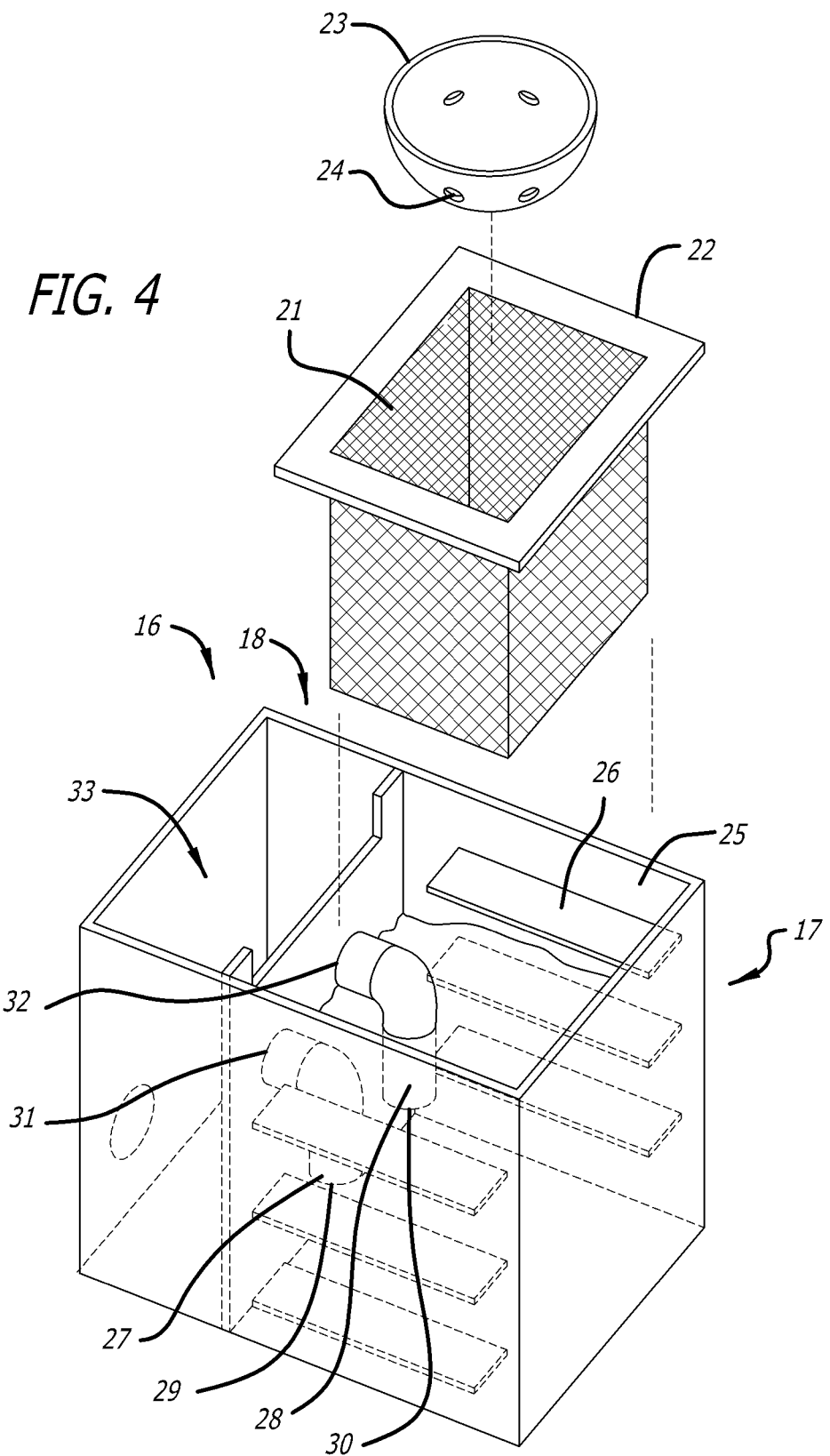
FIG. 4 shows an exploded perspective view of the storm water drain system shown in FIG. 3.

Referring now to FIGS. 3 and 4 a receptacle 16 is shown having a container 17 and an outlet bay 18. The catchpit entry may include a curb entry lintel 19 and access grate 20. Filter basket 21 includes a flange 22 to support the basket above and seal with respect to container 17. Flow from the inlet is directed into filter basket 21 which collects gross particulate material. The basket 21 has a deflector 23 positioned in its base, although it could be suspended within the filter bag above the base of the bag. The deflector 23 may be of a concave, parabolic dish form with drainage holes 24. It will however, be appreciated that other deflector shapes may be effective in retarding and dispersing an incident flow. Flow deflected upwardly and outwardly by deflector 23 may be retarded by or pass through the mesh of basket 21 towards walls 25. One or more of the walls 25 bay be provided with one or more baffles 26 to retard flow as it flows down the walls. The baffles may be in the form of a plurality of deflectors angled outwardly and downwardly from the side walls although other shapes may achieve the same effect.

During normal operation a sump of standing water S remains in the container 17. The level of this sump water is controlled by a low flow outlet. In this case the low flow outlet is in the form of a pair of elbows 27 and 28 which define a fluid path from a first level at inlets 29 and 30 to a second level at outlets 31 and 32. This ensures that floatable materials and oils etc. are retained within the container 17 and prevents the entry of mosquitos etc. The size on the inlet orifices may be dimensioned to provide desired flow characteristics for a specific application.

During high flow conditions the container 17 may fill at a rate faster than the low flow outlets can remove it and under these conditions a lowered section 33 in a wall between container 17 and outlet bay 18 defines a bypass flow path with the excess flow simply flowing over the edge of the receptacle into the outlet bay and exiting via outlets 34.

By controlling the level of sump water S within container 17 and deflecting the flow just above the sump water level S energy may be effectively removed from the flow. The retarded flow may then settle within the standing sump region S promoting suspended sediment to drop out of the flow for collection within container 17. The bottom of the basket 21 is at a height above the sump water level and so gross particulate matter is kept dry between periods of flow.

In the above examples the basket may have a mesh size of 1 mm or less if mosquito exclusion is required. In other cases a mesh size of about 5 mm may be appropriate. An energy dissipater may be provided in the base of a basket or bag to further dissipate energy in the flow. A contaminant absorbing bag may also be provided in the receptacle to remove hydrocarbons etc.

The receptacles may be formed of plastics, fiberglass, fibre reinforced plastics, metal or other suitable material. Lateral flexible flanges may be provided around the top edges of the receptacle edges to seal against the catchpit walls.

Figure 5:
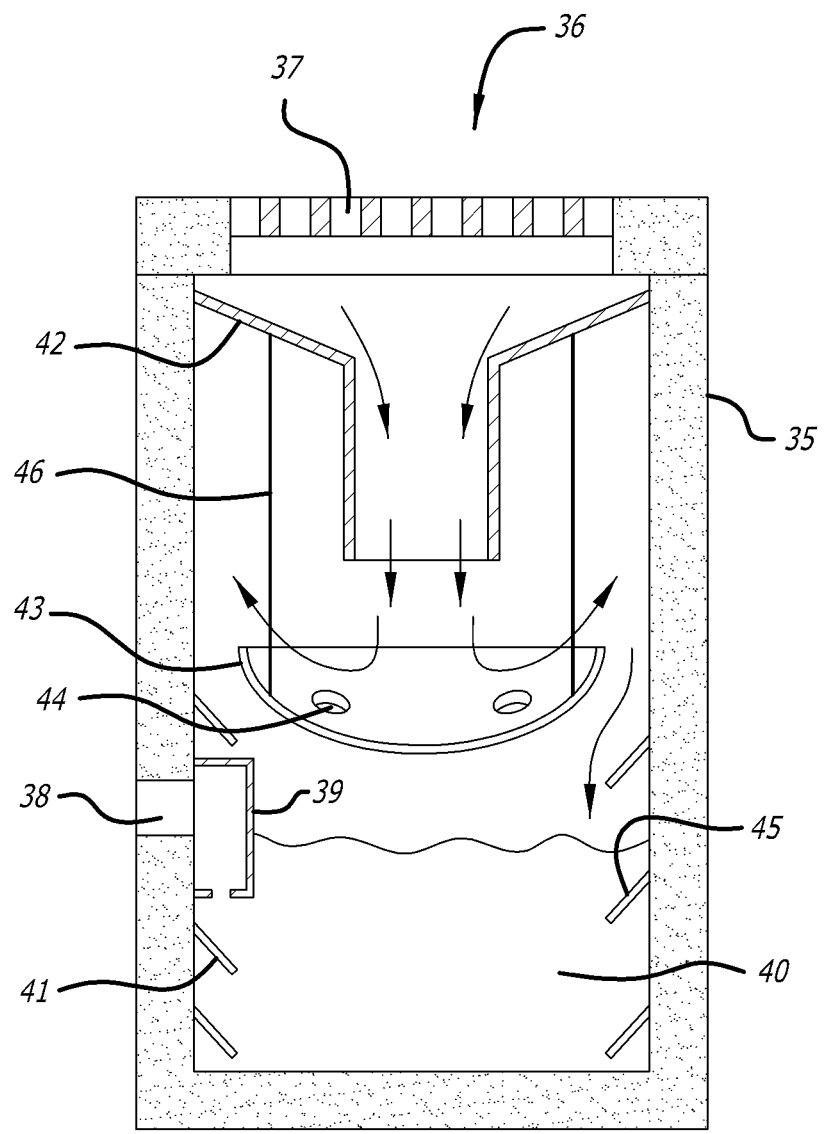
FIG. 5 shows a cross-sectional side view of a storm water drain system including a suspended deflector.

Referring now to FIG. 5 a simplified design without a basket or receptacle will be described. A catchpit 35 has an inlet 36 covered by a grate 37 and a catchpit outlet 38. A conduit 39 provides a fluid outlet path from a lower level within sump 40 to the outlet 38.

One or more check dams 41 may also be provided at the inlet to conduit 39 to further retard fluid flow.

A funnel 42 is provided below inlet 36 to direct incident flow towards the centre of a deflector 43. Whilst not essential the funnel ensures better distribution by the deflector 43. Deflector 43 may be of a generally flat form or a concave, parabolic dish form with drainage holes 44. It may be suspended by cables 46 or rods etc. from funnel 42 or from the grate or may be mounted to a side wall of the pit. It will be appreciated that other deflector shapes may be effective in retarding and dispersing an incident flow.

Fluid deflected upwardly and outwardly by deflector 43 loses much of its energy before contacting the side walls of catchpit 35. One or a series of deflectors 45 may be provided on one or more side walls of the catchpit 35 to retard flow as it moves down the walls into sump water 40. The de-energised sump water settles and its outward flow is controlled by conduit 39 and check dam 41 to promote the settling of sediment out of the flow to be collected in the base of the catchpit.

There are thus provided systems that may be fitted to new catchpits or retrofitted to existing catchpits. New catchpits of simple design may be provided with enhanced functionality whilst existing catchpits may be provided with a sump of standing water providing enhanced performance that may otherwise require expensive modification.

The use of deflectors removes energy from the flow, lowers flow velocity, changes flow direction, entrains air, and extends the flow path to allow suspended material to drop out for collection in the catchpit.

The maintenance of a level of sump water dissipates the energy of the incident flow and allows settling out of sediment from the flow. Where a bag is provided at the sump water level the sump water level dissipates energy at the base of the bag.

The receptacle captures both suspended particulates and floating contaminants (e.g. oil).

Baskets capture gross solids and holds them dry, preventing decomposition in sump water. The baskets are easily removable to provide access to sump for cleaning. Trapped material is thus kept out of the water flow (even during high flow) reducing contamination of exiting water. Bypass flow paths allow peak water flows in large storms without restriction beyond the inherent capacity of the catchpit.

Experiments have shown increased suspended sediment removal of around 40%-75% for a given particle size and flow rate when employing a receptacle when compared to a standard pit.

There is thus provided a filter system and components that are simple, reliable, light weight, inexpensive to manufacture, compact for transportation, retain their shape well, maximize filter area and storage volume and is easy to install and maintain.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A removable catch basin receptacle for a storm water drain pit comprising a container having:
   a. a base and side walls defining an opening at the top of the container;
   b. a low flow outlet defining a fluid path for fluid at a first level within the container to a second level, higher than the first level, outside the container;
   c. an overflow path providing a fluid flow path out of the container at a level higher than the first or second level; and
   d. a filter bag at the opening of the container to retain gross particulates, wherein the bottom of the filter bag is at a height above the second level.

2. A receptacle as claimed in claim 1 wherein the low flow outlet is in the form of one or more conduit each having a first open end at the first level and second open end passing through a side wall of the container at the second level.

3. A receptacle as claimed in claim 1 wherein the low flow outlet is in the form of a divider between side walls of the container defining a channel from the first level to an outlet passing through a side wall of the container at the second level.

4. A receptacle as claimed in claim 1, wherein one or more check dam is provided near an inlet to the low flow outlet.

5. A receptacle as claimed in claim 1, wherein the overflow path is a lowered edge on a wall of the container.

6. A receptacle as claimed in claim 1, including an outlet bay positioned adjacent a side wall of the container receiving fluid from the low flow outlet and overflow path.

7. A receptacle as claimed in claim 6 wherein the outlet bay includes an outlet at its base.

8. A receptacle as claimed in claim 1 wherein a deflector is provided within the filter bag.

9. A receptacle as claimed in claim 8 wherein the deflector is configured to direct incident fluid flow outwardly and upwardly.

10. A storm water drain system including a catchpit including a receptacle as claimed in claim 1 positioned in the catchpit below the inlet.

11. A receptacle as claimed in claim 1, wherein the filter bag has a mesh size less than one (1) mm.

12. A storm water drain pit bag formed at least partially of a mesh material including one or more deflector positioned and arranged within the bag to deflect flow entering the bag outwardly and upwardly through side walls of the bag, wherein at least one deflector has one or more apertures for drainage.

13. A bag as claimed in claim 12 wherein at least one deflector has a concave shape.

14. A bag as claimed in claim 12 having a mesh size less than 1 mm.

15. A bag as claimed in claim 12 having permeable and impermeable sections.

* * * * *